US011542349B2

(12) United States Patent
Lecouvet et al.

(10) Patent No.: US 11,542,349 B2
(45) Date of Patent: Jan. 3, 2023

(54) PROCESS FOR MANUFACTURE OF LOW EMISSION HOMOPOLYMER OR RANDOM POLYPROPYLENE

(71) Applicant: SABIC GLOBAL TECHNOLOGIES B.V., Bergen op Zoom (NL)

(72) Inventors: Benoit Therese Philippe Lecouvet, Geleen (NL); Christelle Marie Helene Grein, Geleen (NL)

(73) Assignee: SABIC GLOBAL TECHNOLOGIES B.V, Bergen op Zoom (NL)

( * ) Notice: Subject to any disclaimer, the term of this patent is extended or adjusted under 35 U.S.C. 154(b) by 487 days.

(21) Appl. No.: 16/468,616

(22) PCT Filed: Dec. 12, 2017

(86) PCT No.: PCT/EP2017/082465
§ 371 (c)(1),
(2) Date: Jun. 11, 2019

(87) PCT Pub. No.: WO2018/108936
PCT Pub. Date: Jun. 21, 2018

(65) Prior Publication Data
US 2020/0087431 A1 Mar. 19, 2020

(30) Foreign Application Priority Data
Dec. 12, 2016 (EP) .................... 16203436

(51) Int. Cl.
| C08F 110/06 | (2006.01) |
| C08F 2/34 | (2006.01) |
| C08F 4/646 | (2006.01) |
| C08F 4/651 | (2006.01) |
| C08F 4/654 | (2006.01) |
| C08F 4/656 | (2006.01) |
| C08F 8/50 | (2006.01) |
| C08F 210/06 | (2006.01) |
| C08K 5/14 | (2006.01) |

(52) U.S. Cl.
CPC .............. C08F 110/06 (2013.01); C08F 2/34 (2013.01); C08F 4/6465 (2013.01); C08F 4/651 (2013.01); C08F 4/6548 (2013.01); C08F 4/6565 (2013.01); C08F 8/50 (2013.01); C08F 210/06 (2013.01); C08K 5/14 (2013.01); C08F 2810/10 (2013.01)

(58) Field of Classification Search
CPC ....... C08F 110/06; C08F 2/34; C08F 2810/10
See application file for complete search history.

(56) References Cited

U.S. PATENT DOCUMENTS

| 4,282,076 A | 8/1981 | Boynton |
| 4,866,022 A | 9/1989 | Arzoumanidis et al. |
| 5,093,415 A | 3/1992 | Brady, III et al. |
| 6,057,407 A | 5/2000 | Lin et al. |
| 6,218,504 B1 | 4/2001 | Dolle et al. |
| 6,395,670 B1 | 5/2002 | Morini et al. |
| 2009/0264607 A1 | 10/2009 | Terreur et al. |
| 2012/0022222 A1* | 1/2012 | van der Ham ......... C08F 10/00 526/65 |
| 2016/0152810 A1 | 6/2016 | Resconi et al. |
| 2016/0272741 A1 | 10/2016 | Wang et al. |
| 2016/0333121 A1 | 11/2016 | Batinas-Geurts et al. |

FOREIGN PATENT DOCUMENTS

| EP | 0063654 A1 | 11/1982 | |
| EP | 0019330 B1 | 8/1983 | |
| EP | 398698 A2 | 11/1990 | |
| EP | 0799839 A2 | 10/1997 | |
| EP | 1273595 A1 | 1/2003 | |
| EP | 1717269 A1 | 11/2006 | |
| EP | 1838741 B1 | 4/2011 | |
| EP | 2452959 A1 | 5/2012 | |
| GB | 1272778 A | 5/1972 | |
| WO | 9632426 A1 | 10/1996 | |
| WO | 02088194 A1 | 11/2002 | |
| WO | 03066828 A2 | 8/2003 | |
| WO | 2004039848 A1 | 5/2004 | |
| WO | 2006056338 A1 | 6/2006 | |
| WO | 2007134851 A1 | 11/2007 | |
| WO | 2009080821 A2 | 7/2009 | |
| WO | WO-2015075054 A1 * | 5/2015 | ............ C08F 110/06 |
| WO | WO-2015091983 A1 * | 6/2015 | ............ C08F 110/06 |
| WO | 2015150042 A1 | 10/2015 | |
| WO | 2016066446 A1 | 5/2016 | |
| WO | 2016198344 A1 | 12/2016 | |
| WO | 2018108929 A1 | 12/2017 | |
| WO | 2018108927 A1 | 6/2018 | |
| WO | 2018108928 A1 | 6/2018 | |
| WO | 2018108932 A1 | 6/2018 | |
| WO | 2018108935 A1 | 6/2018 | |

OTHER PUBLICATIONS

European Search Report; European Application No. 16203436.7; Filing Date: Dec. 12, 2016; 3 pages.
International Search Report; International Application No. PCT/EP2017/082465; International Filing Date: Dec. 12, 2017; dated Mar. 26, 2018; 5 pages.
Periodic System of the Elements (Handbook of Chemistry and Physics, 70th Edition, CRC Press, 1989-1990 (1 page).
(Continued)

*Primary Examiner* — Catherine S Branch
(74) *Attorney, Agent, or Firm* — Cantor Colburn LLP

(57) ABSTRACT

The invention relates to a process for the preparation of a propylene homopolymer or a propylene α-olefin random copolymer comprising the step of a) preparing a propylene homopolymer or a propylene α-olefin random copolymer, wherein the α-olefin is chosen from the group consisting of ethylene, and α-olefins having 4 to 10 carbon atoms, for example 1-butene or 1-hexene by contacting at least the propylene and optionally α-olefin, with a catalyst in a gas-phase reactor at a temperature T1 and a pressure P1, wherein T1 is chosen in the range from 75 to 90° C., for example in the range from 77 to 85° C., for example in the range from 78 to 83° C., wherein P1 is chosen in the range from 22 to 30 bar to prepare a propylene homopolymer (A') or a propylene α-olefin random copolymer (A').

14 Claims, No Drawings

(56) References Cited

OTHER PUBLICATIONS

Soares et al. "Particle Growth and Single Particle Modeling" Polyolefin Reaction Engineering, First Edition, Chapter 7, 2012, pp. 1-39.
Soares et al. "Polyolefin Reactors and Processes" Polyolefin Reaction Engineering, First Edition, Chapter 4, 2012, pp. 1-43.
VDA 278 "Thermal Desorption Analysis of Organic Emissions for the Characterization of Non-Metallic Materials for Automobiles", Oct. 2011, pp. 1-19.
Written Opinon; International Application No. PCT/EP2017/082465; International Filing Date: Dec. 12, 2017; dated Mar. 26, 2018; 8 pages.

* cited by examiner

PROCESS FOR MANUFACTURE OF LOW EMISSION HOMOPOLYMER OR RANDOM POLYPROPYLENE

CROSS REFERENCE TO RELATED APPLICATIONS

This application is a 371 of International Application No. PCT/EP2017/082465, filed Dec. 12, 2017, which is incorporated by reference in its entirety, and which claims priority to European Application Serial No. 16203436.7, filed Dec. 12, 2016.

The present invention relates to a process for the manufacture of a propylene homopolymer or a propylene α-olefin random copolymer, a propylene homopolymer or a propylene α-olefin random copolymer obtained or obtainable by said process and to the use of said a propylene homopolymer or a propylene α-olefin random copolymer, preferably in automotive interior applications.

Propylene homopolymers and propylene α-olefin random copolymers are widely used as component in a composition for automotive applications. One of the requirements for propylene polymers in automotive interior applications is that it has a relatively low emission of low molecular weight materials. In other words, such propylene polymers may contain only a very low amount of low molecular weight oligomers, because such low molecular weight materials may cause an unpleasant odor, a sticky feeling of the surface or may condense against windscreens thereby causing a reduced visibility.

One of the requirements related to such emission is laid down in the VDA 278 standard. The emission as determined in that standard is referred to as the FOG value. For example car manufacturers may require that the FOG value is typically at most 500 µg/g, more in particular at most 400 µg/g. With requirements becoming more strict in future, even lower FOG values such as FOG values of at most 350 µg/g or even at most 250 µgig may become desirable.

Currently a method for reducing FOG emission involves maintaining polypropylene pellets or powders at a certain elevated temperature for a certain amount of time. For example polypropylene pellets or powders may be continuously fed to the top of a silo where the polypropylene is preferably contacted in counter-flow with a stream of hot gas, which may be for example nitrogen or dried air. At the bottom of the silo polypropylene having a reduced FOG value is then continuously withdrawn. This process is often referred to as venting, degassing or purging. It is noted that this venting, degassing or purging should not be confused with the removal of unreacted monomer as is usually carried out directly after polymerisation.

Venting, degassing or purging processes are disclosed for example in GB 1272778, WO 02/088194, WO2004/039848 and U.S. Pat. No. 6,218,504. Other methods to remove low molecular weight materials also exist, among which are steam stripping or chemical treatment.

A special process for venting is disclosed in WO2015/150042A1, which discloses a method for manufacture of a polypropylene having a target melt flow rate of from 10 to 200 g/10 min as determined in accordance with ISO1133 (230° C., 2.16 kg) comprising the sequential steps of i) Polymerizing the propylene monomer, an optionally one or more alpha olefin comonomers so as to form a polypropylene having an initial melt flow rate of from 0.5 to 20 g/10 min (ISO1133, 230° C., 2.16 kg), ii) Visbreaking said polypropylene of step i) to obtain polypropylene having said target melt flow rate and wherein the ratio of target to initial melt flow rate is more than 1 iii) Maintaining the polypropylene obtained from step ii) at a temperature of at least 105° C. for a period of at least 48 hr.

A disadvantage of a venting step is that such an extra step adds cost to the final polypropylene product. In particular it is noted that propylene homopolymers and propylene α-olefin random copolymers having a relatively high initial FOG value generally need to be maintained for a longer period of time in the venting equipment. Such a longer residence time not only increases the overall cost, but may also have a negative effect on the optical properties of the material in that the propylene homopolymers and propylene α-olefin random copolymers may suffers more from yellowing due to partial thermal degradation.

It is therefore an object of the present invention to provide a process for the preparation of a propylene homopolymer or a propylene α-olefin random copolymers having low FOG values.

Accordingly, the present invention provides a process for the preparation of a propylene homopolymer or a propylene α-olefin random copolymer comprising the step of a) preparing a propylene homopolymer or a propylene α-olefin random copolymer, wherein the α-olefin is chosen from the group consisting of ethylene, and α-olefins having 4 to 10 carbon atoms, for example 1-butene or 1-hexene by contacting
at least the propylene and optionally α-olefin
with a catalyst in a gas-phase reactor at a temperature T1 and a pressure P1
wherein T1 is chosen in the range from 75 to 90° C., for example in the range from 77 to 85° C., for example in the range from 78 to 83° C.
wherein P1 is chosen in the range from 22 to 30 bar
to prepare a propylene homopolymer (A') or a propylene α-olefin random copolymer (A')

It is generally avoided to use a too high T1, since then the catalyst activity is believed to become too high, which will result in fouling of the gas phase reactor (caused by the production of fines or even lumps).

However, it has been found that in the process of the invention, wherein T1 is chosen in the range from 75 to 90° C., it is possible to produce propylene homopolymers and propylene α-olefin random copolymers having decreased FOG values.

The pressure of the gas phase reactor (P1) is in principal not critical and may be chosen in the range from 22 to 30 bar.

The person skilled in the art is aware of what type of gas phase reactors are suitable for the preparation of propylene homopolymers and propylene α-olefin random copolymers. For example, Polyolefin Reaction Engineering by J. B. P. Soares and T. F. L. McKenna, July 2012 gives an overview of reactor and processes in Chapter 4. Polyolefin Reactors and Processes. In a preferred embodiment of the invention, the gas-phase reactor is a horizontally stirred gas-phase reactor.

Propylene Homopolymer (A') or Propylene α-Olefin Random Copolymer (A')

Preferably, the melt flow rate of the propylene homopolymer (A') or the propylene α-olefin random copolymer (A') is in the range from 5.0 to 150 dg/min as measured according to ISO1133 (2.16 kg, 230° C.).

For example, the propylene homopolymer (A') or the propylene α-olefin random copolymer (A') has a melt flow rate of at most 150 dg/min, preferably at most 125 dg/min, preferably at most 100 dg/min, preferably at most 90 dg/min, preferably at most 80 dg/min, preferably at most 70 dg/min, preferably at most 60 dg/min, most preferably at most 50 dg/min, for example at most 40 dg/min. This is advantageous for low emission of the propylene homopolymer (A') or the propylene α-olefin random copolymer (A') since the amount of low molecular weight oligomers increases with increasing the melt flow rate of the propylene-based matrix. Preferably, the propylene homopolymer (A') or the propylene α-olefin random copolymer (A') has a melt flow rate of at least 5 dg/min, at least 7 dg/min, at least 9 dg/min, at least 11 dg/min or for example at least 13 dg/min, for example at least 15dg/min. For example, the propylene homopolymer (A') or the propylene α-olefin random copolymer (A') may have a melt flow rate in the range from 11 to 50 dg/min.

For purpose of the invention, melt flow rate (MFR) is measured according to ISO1133 (2.16 kg/230° C.).

Preferably, the FOG value of the propylene homopolymer (A') or the propylene α-olefin random copolymer (A') is at most 400 μg/g, more preferably at most 300 μg/g, more preferably at most 250 μg/g, more preferably at most 200 μg/g as determined by VDA 278.

The process of the invention may further comprise the step of prepolymerization of propylene homopolymer or a propylene α-olefin random are prepared from propylene, optional α-olefin and a prepolymer.

Polyolefin Reaction Engineering by J. B. P. Soares and T. F. L. McKenna, July 2012, describes in Chapter 7. Particle growth and single particle modelling that "One common way of avoiding loss of control over the reaction and the morphology at this point is the use of a prepolymerization step. Doing this allows us to produce polymer at a reasonable rate, generating just enough stress that the particles fragment but not so much and not too quickly that they disintegrate. In addition, it has the benefit that particles are grown to a size large enough that heat and mass transfer limitations are eliminated, or at least reduced to manageable levels. Finally, it appears that prepolymerization also helps to increase the activity of the catalyst in the main reactor with respect to nonprepolymerized ones. Prepolymerization refers to the act of injecting the catalyst powder into a reactor that operates under relatively mild conditions (a few bars of monomer at most and occasionally a lower temperature) and produces in the order of 10-100 g of polymer per gram of catalyst. The prepolymerized powder is then injected into the main reactor train. Prepolymerization is typically carried out in slurry conditions even if the main reactor is a gas-phase one and is done in a reactor that is significantly smaller than the main reactor(s)."

In a special embodiment, therefore, in step a) of the process of the invention, the propylene homopolymer or a propylene α-olefin random copolymer are prepared from propylene, optional α-olefin and a prepolymer, wherein the prepolymer is prepared by contacting propylene and optional α-olefin with a catalyst in a prepolymerization reactor.

Catalyst System

The propylene homopolymer or a propylene α-olefin random copolymer may be prepared by contacting the propylene with a catalyst system respectively by contacting the propylene and the α-olefin with a catalyst system. Examples of catalyst systems are known to the person skilled in the art and include Ziegler Natta and metallocene based catalyst systems.

In the process of the invention, step a) and/or the prepolymerization step may be performed by contacting propylene and the optional α-olefin with a catalyst system, preferably a catalyst system which comprises a Ziegler-Natta catalyst and at least one external electron donor, which external electron donor is preferably chosen from the group of a compound having a structure according to Formula III $(R^{90})_2N-Si(OR^{91})_3$, a compound having a structure according to Formula IV: $(R^{92})Si(OR^{93})_3$ and mixtures thereof.

wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, for example ethyl, methyl or n-propyl, for example diethylaminotriethoxysilane (DEATES), n-propyl triethoxysilane, (nPTES), n-propyl trimethoxysilane (nPTMS); and organosilicon compounds having general formula $Si(OR^a)_{4-n}R^b{}_n$, wherein n can be from 0 up to 2, and each of $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBuPDMS), cyclohexyl methyldimethoxysilane (CHMDMS), dicyclopentyl dimethoxysilane (DCPDMS) or di(iso-propyl) dimethoxysilane (DiPDMS). More preferably, the external electron donor is chosen from the group of di(iso-propyl) dimethoxysilane (DiPDMS), diethylaminotriethoxysilane (DEATES), n-propyl triethoxysilane, (nPTES), n-propyl trimethoxysilane (nPTMS) and mixtures thereof.

Such organosilicon compounds mentioned above are known in the art (for instance as disclosed in documents WO2006/056338A1, EP183874161, U.S. Pat. No. 6,395, 670B1, EP398698A1, WO96/32426A).

Preferably, the catalyst system used, is obtained by a catalyst preparation process comprising the steps of:
  providing a magnesium-based support;
  optionally activating said magnesium-based support using an activator;
  contacting said magnesium-based support with a Ziegler-Natta type catalytic species, and optionally one or more internal electron donors to yield a procatalyst, and
  contacting said procatalyst with a co-catalyst and at least one external electron donor;
More preferably, the catalyst system is obtained by
a catalyst preparation process comprising the steps of:
A) providing a procatalyst obtainable via a process comprising the steps of:
  i) contacting a compound $R^4{}_zMgX^4{}_{2-z}$ with an alkoxy- or aryloxy-containing silane compound to give a first intermediate reaction product, being a solid $Mg(OR^1)_xX^1{}_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;
  ii) optionally contacting the solid $Mg(OR^1)_xX^1{}_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor to form a catalyst;

Preferably in step i) of said process, the compound of formula $R^4_zMgX^4_{2-z}$ is a phenyl or butyl Grignard reagent (PhMgCl or BuMgCl), more preferably a BuMgCl.

The aluminum/external donor molar ratio in the catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Some examples of Ziegler-Natta (pro)catalysts and their preparation method can be found in EP 1 273 595, EP 0 019 330, U.S. Pat. No. 5,093,415, Example 2 of U.S. Pat. Nos. 6,825,146, 4,771,024 column 10, line 61 to column 11, line 9, WO03/068828, U.S. Pat. No. 4,866,022, WO96/32426A, example I of WO 2007/134851 A1, all of which are hereby incorporated by reference.

The procatalyst thus prepared can be used in polymerization of olefins using an external donor and a co-catalyst.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst as are known to the skilled person. Preferably, the cocatalyst is selected from trimethylaluminium, triethylaluminum, triisobutylaluminum, trihexylaluminum, di-isobutylaluminum hydride, trioctylaluminium, dihexylaluminum hydride and mixtures thereof, most preferably, the cocatalyst is triethylaluminium (abbreviated as TEAL).

The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters) or benzoic acid esters, for example ethyl benzoate; (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm, for example of 0 ppm based on the total weight of the catalyst.

The molar ratio of the internal donor relative to the magnesium can be from 0.02 to 0.5. Preferably, this molar ratio is preferably between 0.05 and 0.2.

Propylene α-Olefin Random Copolymer

The propylene-α-olefin copolymer preferably consisting of at least 90 wt % of propylene and at most 10 wt % of α-olefin, based on the total weight of the propylene-based matrix.

The α-olefin is preferably a C2 or C4-C12 α-olefin, that is an α-olefin having 2 carbon atoms or having 4 to 12 carbon atoms, such as for example ethylene, 1-butene, 1-pentene, 1-methyl-4-penthene, 1-hexene, 1-heptene or 1-octene and is preferably ethylene. For example, the propylene α-olefin copolymer is a propylene-ethylene copolymer or a propylene-hexene copolymer.

The amount of α-olefin in the propylene-α-olefin copolymer may be determined using $^{13}C$ NMR as is known to the person skilled in the art.

In another aspect, the invention relates to the process of the invention, further comprising the subsequent step of (II) visbreaking the propylene homopolymer (A') or the propylene α-olefin random copolymer (A') to obtain a propylene homopolymer (A) or a propylene α-olefin random copolymer (A), wherein the propylene homopolymer (A) respectively the propylene α-olefin random copolymer (A) has a melt flow rate that is higher than the melt flow rate of the propylene homopolymer (A') respectively propylene α-olefin random copolymer (A') as measured according to ISO1133 (2.16 kg, 230° C.).

The term "visbreaking" is well known in the field of the invention. Visbreaking is also referred to as (peroxide) shifting or controlled rheology.

For example, methods of visbreaking polypropylene have been disclosed in U.S. Pat. No. 4,282,076 and EP 0063654.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate polypropylene). However, the invention is not limited to such an embodiment and visbreaking may also be carried out on already pelletised polypropylene, which polypropylene generally contains stabilisers to prevent degradation.

Examples of suitable peroxides include organic peroxides having a decomposition half-life of less than 1 minute at the average process temperature during step II). Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyl peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, a,a'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl persec-octoate, tert-butyl perpivalate, cumyl perpivalate, cumene hydroperoxide, diisopropyl benzene hydroperoxide, 1,3-bis(t-butylperoxy-isopropyl)benzene, dicumyl peroxide, tert-butylperoxy isopropyl carbonate and any combination thereof. Preferably, a dialkyl peroxides is employed in the process according to the present invention. More preferably, the peroxide is a,a'-bis-(tert-butylperoxy)diisopropylbenzene, 2,5-dimethyl-2,5-di(tert-butylperoxy)-hexane or 3,6,9-Triethyl-3,6,9-trimethyl-1,4,7-triperoxonane. Preferably, the peroxide is selected from the group of non-aromatic peroxides.

It can easily be determined by the person skilled in the art through routine experimentation how much peroxide should be used to obtain a composition having the desired melt flow rate. This also depends on the half-life of the peroxide and on the conditions used for the melt-mixing, which in turn depend on the exact composition.

Typically, the amount of peroxide used will lie in the range of 0.02 to 0.5 wt %, for example 0.08 to 0.2 wt %, for example 0.1 to 0.2 wt %, depending on the melt flow rate of the propylene homopolymer (A') or the propylene α-olefin random copolymer (A') and on the desired melt flow rate of the propylene homopolymer (A) or the propylene α-olefin random copolymer (A).

The ratio of melt flow rate of the propylene homopolymer (A) or the propylene α-olefin random copolymer (A) to the melt flow rate of the propylene homopolymer (A') respectively the propylene α-olefin random copolymer (A') is preferably at least 1.1, for example at least 1.5, for example at least 2, for example at least 2.5, for example at least 3, for example at least 3.5 and/or for example at most 20, for example at most 15, for example at most 10, for example at most 8. For example, the shifting ratio is in the range from 1.5 to 20, more preferably from 2 to 10, even more preferably from 2.5 to 8.0.

For example, the melt flow rate of the propylene homopolymer (A) or propylene α-olefin random copolymer (A) as measured according to ISO1133 (2.16 kg, 230° C.) is in the range from 15 to 250 dg/min, preferably in the range from 25-250 dg/min.

The propylene homopolymer (A) or the propylene α-olefin random copolymer (A) obtained after step II) preferably has a melt flow rate of at least 15 dg/min, for example at least 30 dg/10 min or at least 60 dg/10 min, and/or at most 250 dg/min, for example at most 200 dg/min or at most 150 dg/min (ISO 1133, 230° C., 2.16 kg). Preferably, the melt flow rate of the propylene homopolymer (A) or the propylene α-olefin random copolymer (A) is in the range from 40 to 150 dg/min (ISO 1133, 230° C., 2.16 kg) or in the range 60 to 120 dg/min (ISO 1133, 230° C., 2.16 kg).

At the same time, however, a high melt flow rate is advantageous due to the trend to down-gauge: the desire to more efficienty produce materials with at least a similar property profile, e.g. producing with less material and/or by using less energy. In order to use less energy for injection molding, a higher melt flow rate of the polymer, in this case a propylene homopolymer or a propylene α-olefin random copolymer, is desired. A higher melt flow rate will enable faster injection molding and hence will reduce the energy needed per produced article. Also, it is a cost-effective solution as this allows for a shorter cycle time and therefore increases productivity.

Preferably, the FOG of the propylene homopolymer (A) or a propylene α-olefin random copolymer (A) is at most 700 μg/g, for example at most 600 μg/g, for example at most 500 μg/g, for example at most 400 μg/g, for example at most 350 μg/g, for example at most 300 μg/g as determined by VDA 278.

In some embodiments, it is possible to further reduce the FOG value of the propylene homopolymer or a propylene α-olefin random copolymer according to the invention by performing the step III) of maintaining the polypropylene obtained from step II) at an elevated temperature for a time sufficient to reduce the FOG value of the propylene homopolymer or the propylene α-olefin random copolymer as determined in accordance with VDA 278. However, it will be appreciated that the present invention is also directed to a process without such step III).

Depending on the conditions at which the propylene homopolymer or a propylene α-olefin random copolymer is maintained in step III), practical lower limits of the FOG values of the propylene homopolymer or a propylene α-olefin random copolymer obtained after step III) include at least 25 μg/g, at least 50 μg/g or at least 100 μg/g.

Therefore, in another aspect, the invention relates to a process of the invention, further comprising the step of III) reducing the FOG value of the propylene homopolymer (A') or the propylene α-olefin random copolymer (A') and/or the propylene homopolymer (A) or the propylene α-olefin random copolymer (A) by maintaining the propylene homopolymer (A') or the propylene α-olefin random copolymer (A') and/or the propylene homopolymer (A) or the propylene α-olefin random copolymer (A) at such temperature and for such time as to allow reduction of the FOG value to the desired level to produce a propylene homopolymer (B') or the propylene α-olefin random copolymer (B')

Step III aims to further reduce the FOG-value and is a so-called venting step.

Preferably, by such venting step, the propylene homopolymer (B') or a propylene α-olefin random copolymer (B') has an FOG value of at most 400 μg/g, for example at most 350 μg/g, for example at most 300 μg/g, for example at most 250 μg/g as determined by VDA 278.

In another aspect, the invention relates to a propylene homopolymer or a propylene α-olefin random copolymer obtained or obtainable by the process of the invention.

The propylene homopolymer (A), (A'), (B') or the propylene α-olefin random copolymer (A), (A'), (B') may be combined with one or more reinforcing fillers and/or impact modifiers and/or further additives. Examples of such reinforcing fillers include organic fibers, such as aramid, carbon or polyester fibers; inorganic fibers such as glass fibres; inorganic reinforcing fillers such as talc or clay nanoparticles.

For example, the propylene homopolymer (A), (A'), (B') or the propylene α-olefin random copolymer (A), (A'), (B') may be compounded with a reinforcing filler, such as talc, and thereafter maintained at an elevated temperature so as to reduce the FOG value.

Similarly the reinforcing filler may be added to the propylene homopolymer (A), (A'), (B') or the propylene α-olefin random copolymer (A), (A'), (B').

For example, the propylene homopolymer (A), (A'), (B') or the propylene α-olefin random copolymer (A), (A'), (B') may be combined with less than 5 wt % of inorganic reinforcing fillers, more preferably, less than 4 wt %, even more preferably less than 3 wt %, even more preferably less than 2 wt %, even more preferably less than 1 wt %, even more preferably less than 0.5 wt %, even more preferably less than 0.3 wt %, even more preferably less than 0.1 wt %, most preferably less than 0.01 wt % inorganic reinforcing filler.

The propylene homopolymer or the propylene α-olefin random copolymer obtained or obtainable by the process of the invention may be compounded with such further materials, e.g. reinforcing fillers, using methods known in the art.

Alternatively the propylene homopolymer (A), (A'), (B') or the propylene α-olefin random copolymer (A), (A'), (B') may be combined with one or more of a glass multifibre filament strand, or roving, for example in an amount in the range of 10-40 wt %. Such may be accomplished by pulling such multifilament strand through a bath of molten thermoplastic material comprising or consisting of said propylene homopolymer or propylene α-olefin random copolymer. Alternatively the thermoplastic material comprising or consisting of said propylene homopolymer or the propylene α-olefin random copolymer is applied as a sheath over said multifibre strand. Such a method is known for example from WO 2009/080821. The so sheathed or pulltruded continuous (glass) multifilament strands may be cut into pellets of desired length such as from 2-50 mm, 5-20 mm or 10-15 mm.

Here again the step of pultrusion or sheathing may be carried out using the propylene homopolymer (A), (A'), (B') or the propylene α-olefin random copolymer (A), (A'), (B').

In yet another aspect, the invention relates to an article comprising the propylene homopolymer (A), (A'), (B') or the propylene α-olefin random copolymer (A), (A'), (B') of the invention, wherein preferably the article is an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

In yet another aspect, the invention relates to the use of the propylene homopolymer (A), (A'), (B') or the propylene α-olefin random copolymer (A), (A'), (B') according to the invention for the manufacture of an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

In yet another aspect, the invention relates to a process for the production of an article comprising the propylene homopolymer (A), (A'), (B') or the propylene α-olefin random copolymer (A), (A'), (B'), wheren the article is preferably an automotive interior article such as instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

It will be understood that the description of the the propylene homopolymer (A), (A'), (B') or the propylene α-olefin random copolymer (A), (A'), (B'), in this document applies to the propylene homopolymer (A') or the propylene α-olefin random copolymer (A'), as well as to the the propylene homopolymer (A) or the propylene α-olefin random copolymer (A) (obtained after step II), as well as to the the propylene homopolymer (B') or the propylene α-olefin random copolymer (B') (obtained after step III), unless otherwise stated.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

EXAMPLES

Measurements
Melt Flow Rate
Melt flow rate was determined in accordance with ISO 1133 at 230° C. and 2.16 kg.
FOG
FOG was determined according to VDA 278:2011 from pellets. FOG according to VDA 278 is the sum of all organic compounds of low volatility, which have an elution time greater than or equal to n-tetradecane. FOG is calculated as tetradecane equivalent (TE). FOG according to VDA 278 represents organic compounds in the boiling point range of n-alkanes $C_{14}$ to $C_{32}$. VDA standards are issued by "Verband der Automobilindustrie". The VDA standards used herein are available from Dokumentation Kraftfahrwesen (DKF); Ulrichstrasse 14, D-74321 Bietigheim-issingen, Germany or can be downloaded from their website (www.dkf-ev.de). Immediately after peroxide shifting (step II), samples were taken and sealed in Lamigrip aluminium bags from Fisher Scientific. The FOG values were measured within a week from sealing the bags. To allow a direct comparison, all VDA278 measurements were carried out on the same GC equipment.

Experimental

Catalyst I

Catalyst I is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Catalyst II

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (DBE, 150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the Intermediate Reaction Product 250 mL of dibutyl ether was introduced to a 1 L reactor fitted with a propeller stirrer and two baffles. The reactor was thermostated at 35° C. and the stirrer speed was kept at 200 rpm. Then a cooled (to 15° C.) 360 mL solution of the Grignard reaction product as prepared in A and 180 ml of a cooled (to 15° C.) solution of 38 ml of tetraethoxysilane (TES) in 142 ml of DBE were dosed into the reactor for 400 min. with preliminary mixing in a minimixer of 0.15 ml volume, which was cooled to 15° C. by means of cold water circulating in the minimixer jacket. The premixing time was 18 seconds in the minimixer and the connecting tube between the minimixer and the reactor. The stirring speed in the minimixer was 1000 rpm. On the dosing completion, the reaction mixture was kept at 35° C. for 0.5 hours. Then the reactor was heated to 60° C. and kept at this temperature for 1 hour. Then the stirring was stopped and the solid substance was allowed to settle. The supernatant was removed by decanting. The solid substance was washed three times using 300 ml of heptane. As a result, a white solid reaction product was obtained and suspended in 200 ml of heptane.

Under an inert nitrogen atmosphere at 20° C. a 250 ml glass flask equipped with a mechanical agitator is filled with a slurry of 5 g of the reaction product of step B dispersed in 60 ml of heptane. Subsequently, a solution of 0.86 ml methanol (MeOH/Mg=0.5 mol) in 20 ml heptane is dosed under stirring during 1 hour. After keeping the reaction mixture at 20° C. for 30 minutes the slurry was slowly allowed to warm up to 30° C. for 30 min and kept at that temperature for another 2 hours. Finally the supernatant liquid is decanted from the solid reaction product which was washed once with 90 ml of heptane at 30° C.

C. Preparation of the Catalyst

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DBP) (DBP/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 60° C., after which the catalyst III, suspended in heptane, was obtained.

Catalyst III

Catalyst III is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Propylene Homopolymer Polymerization Experiments

Step I)

Polymerization experiments of propylene homopolymers (Table 1) were performed on a bench-scale gas-phase reactor using catalysts I, II and III described above at different reaction temperatures (50, 60, 70 and 80° C.) as well as with different external electron donors in order to determine the effect of the reaction temperature on the FOG emission values of the propylene homopolymers. The pressure used was 22 bar. Triethylaluminium was used as co-catalyst, and two external electron donors were employed; di(iso-propyl) dimethoxysilane (DiPDMS) and n-propyltriethoxysilane (nPTES). Homopolymers produced at a temperature of 50, 60 and 70° C. are denoted with CE as comparative experiments. Homopolymers produced at 80° C. are denoted with RE as reference experiments of the present invention. RE and CE are together show the effects of the reaction temperature on the FOG emission values of polypropylene. At a given reaction temperature ($T_{R1}$, also referred in the present invention as the reactor temperature), propylene homopolymers of melt flow rate 50 dg/min were produced at different H2/C3 molar ratios, due to the different hydrogen sensitivity of the external donors. H2/C3 is the molar ratio of hydrogen to propylene in the gas cap of the reactor, measured by on-line gas chromatography.

TABLE 1

Polymerization and FOG data of propylene homopolymers of melt flow rate 50 dg/min

| Exp # | Catalyst | External Donor | $T_{R1}$ ° C. | $H_2/C_3$ mol/mol | FOG µg/g |
|---|---|---|---|---|---|
| CE1 | I | nPTES | 60 | 0.029 | 710 |
| RE1 | I | nPTES | 80 | 0.0157 | 490 |
| CE2 | II | DiPDMS | 60 | 0.061 | 665 |
| RE2 | II | DiPDMS | 80 | 0.049 | 585 |
| CE3 | III | DiPDMS | 60 | 0.048 | 590 |
| RE3 | III | DiPDMS | 80 | 0.029 | 510 |
| CE41 | III | nPTES | 50 | 0.026 | 410 |
| CE42 | III | nPTES | 60 | 0.022 | 290 |
| CE43 | III | nPTES | 70 | 0.013 | 250 |
| RE4 | III | nPTES | 80 | 0.0054 | 190 |

From Table 1, it is clear that for a given melt flow of the propylene homopolymer, the increase in $T_{R1}$ reduces the FOG value, and this effect is independent of the catalyst/external donor system.

From Table 1, it is also clear that the use of nPTES compared to other external electron donors results in lower FOG emission values. Same examples can be used as illustrations.

Moreover, it is shown in Table 1 that the combination of catalyst III and nPTES leads to the lowest FOG values at given MFR and given $T_{R1}$. This can be for example illustrated by comparing CE1/RE1 (catalyst I and nPTES) or CE3/RE3 (catalyst III and DiPDMS) with CE42/RE4 (catalyst III and nPTES).

Additional Examples are presented in Table 2 with the combination of catalyst III and nPTES for a series of propylene homopolymers produced at four different $T_{R1}$ (50, 60, 70 and 80° C.) with a melt flow rate of 30 dg/min.

TABLE 2

Polymerization and FOG data of propylene homopolymers of MFR 30 dg/min

| Exp # | Catalyst | External Donor | $T_{R1}$ ° C. | $H_2/C_3$ mol/mol | FOG µg/g |
|---|---|---|---|---|---|
| CE51 | III | nPTES | 50 | 0.016 | 360 |
| CE52 | III | nPTES | 60 | 0.0149 | 280 |
| CE53 | III | nPTES | 70 | 0.008 | 220 |
| RE5 | III | nPTES | 80 | 0.0037 | 180 |

Same observations are made from Table 2 with respect to the positive effect of higher $T_{R1}$ on lowering the H2/C3 molar ratio and hence on decreasing the FOG emission value of the propylene homopolymers.

Step II)

For achieving high flow propylene homopolymers, these reactor powders (the intermediate propylene homopolymer powders) were melt-processed by peroxide shifting (i.e. visbreaking) to higher melt flow rates to obtain the final propylene homopolymer. This was done by feeding the powder to an extruder and adding Luperco 802PP40 as a peroxide (1,4-bis(2-tert-butylperoxypropan-2-yl)benzene, CAS Registry Number: 2781-00-2) in different concentrations. Table 3 lists details of the visbreaking experiments for reactor powders CE53 and RE5 including starting MFR (intermediate MFR) and final MFR (target MFR), the amount of peroxide in weight percentage and FOG values. Besides the peroxide, some additives common in the art were also added (0.25 weight percentage). The additive package was the same for all experiments.

TABLE 3

FOG data of polypropylene homopolymer powders (the intermediate propylene homopolymer) and the peroxide shifted products (the final propylene homopolymer)

| Exp # | Intermediate MFR dg/min | Target MFR dg/min | $\dfrac{\text{Target } MFR}{\text{Intermediate } MFR}$ | Peroxide wt. % | FOG µg/g |
|---|---|---|---|---|---|
| CE53 | 30 | 30 | 1 | 0 | 220 |
| CE53-S1 | 30 | 92 | 3.07 | 0.041 | 350 |
| RE5 | 30 | 30 | 1 | 0 | 180 |
| RE5-S1 | 30 | 89 | 2.97 | 0.04 | 285 |

*CE53-S1 is peroxide shifted propylene homopolymer from experiment CE53, RE5-S1 is peroxide shifted propylene homopolymer from experiment RE5.
*intermediate MFR is the MFR of the intermediate propylene homopolymer
*target MFR is the MFR of the final propylene homopolymer
*shifting ratio is the target MFR divided by the intermediate MFR Table 3 shows that the visbreaking of an intermediate propylene homopolymer to higher melt flow rates to obtain the final propylene homopolymer commonly results in increased FOG values. This can be for example illustrated by comparing CE53-S1 with CE53, or also by comparing RE5-S1 with RE5.

However, it is also clear from Table 3 that the positive effect of increasing $T_{R1}$ during the polymerization process of the intermediate propylene homopolymer on lowering its FOG value is preserved when peroxide shifting the powder to higher melt flow rates to obtain the final propylene homopolymer. For instance, Example RE5-S1 has lower FOG value than Example CE53-S1, although both propylene homopolymers are peroxide shifted from a melt flow 30 to about 90 dg/min; the only difference between the two examples is the temperature in the reactor ($T_{R1}$) during the polymerization process of their respective intermediate propylene homopolymer; the higher $T_{R1}$, the lower the FOG value of the final propylene homopolymer.

The person skilled in the art knows how to vary the MFR value of the intermediate propylene homopolymer. The MFR value of the intermediate propylene homopolymer influences the FOG values for the desired MFR of the final propylene homopolymer.

Therefore, the present invention demonstrates that propylene homopolymers combining high melt flow and low FOG emissions can be produced in the process of the invention.

The invention claimed is:

1. A process for the preparation of a propylene homopolymer or a propylene α-olefin random copolymer comprising the steps of:
   a) preparing a propylene homopolymer or a propylene α-olefin random copolymer, wherein the α-olefin is chosen from the group consisting of ethylene and α-olefins having 4 to 10 carbon atoms, by contacting at least the propylene and optionally α-olefin with a catalyst in a single gas-phase reactor at a temperature T1 and a pressure P1;
   wherein T1 is chosen in the range from 75 to 83° C.; and
   wherein P1 is chosen in the range from 22 to 30 bar;
   to prepare a propylene homopolymer (A') or a propylene α-olefin random copolymer (A'); and b) visbreaking the propylene homopolymer (A') or the propylene α-olefin random copolymer (A') to obtain a propylene homopolymer (A) or a propylene α-olefin random copolymer (A), wherein the propylene homopolymer (A) respectively the propylene α-olefin random copolymer (A) has a melt flow rate that is higher than the melt flow rate of the propylene homopolymer (A') respectively propylene α-olefin random copolymer (A') as measured according to ISO1133 (2.16 kg, 230° C.); and wherein the FOG value of the propylene homopolymer (A') or the propylene α-olefin random copolymer (A') after the visbreaking and before any subsequent processing step is at most 400 µg/g, as determined by VDA 278.

2. The process according to claim 1, wherein a melt flow rate of the propylene homopolymer (A') or the propylene a-olefin random copolymer (A') is in the range from 5.0 to 150 dg/min as measured according to ISO1133 (2.16 kg, 230° C.).

3. The process according to claim 1, wherein in step a) the propylene homopolymer or a propylene α-olefin random copolymer are prepared from propylene, optional α-olefin and a prepolymer, wherein the prepolymer is prepared by contacting propylene and optional α-olefin with a catalyst in a single prepolymerization reactor.

4. The process according to claim 1, wherein the catalyst is a catalyst system which comprises a Ziegler-Natta catalyst and at least one external electron donor.

5. The process according to claim 1, wherein α-olefin in the propylene α-olefin random copolymer is ethylene.

6. The process according to claim 1, wherein a shifting ratio, which is the ratio of the melt flow rate of the propylene homopolymer (A) or the propylene α-olefin random copolymer (A) to the melt flow rate of the propylene homopolymer (A') or the propylene a-olefin random copolymer (A') is in the range from 1.5 to 20.

7. The process according to claim 1, wherein the melt flow rate of the propylene homopolymer (A) or propylene α-olefin random copolymer (A) as measured according to ISO1133 (2.16 kg, 230° C.) is in the range from 15 to 250 dg/min.

8. The process according to claim 1, wherein the FOG of the propylene homopolymer (A) or a propylene a-olefin random copolymer (A) is at most 700 µg/g, as determined by VDA 278.

9. The process for the preparation of a propylene homopolymer or a propylene a-olefin random copolymer according to claim 1, further comprising step c) reducing the FOG value of the propylene homopolymer (A') or the propylene a-olefin random copolymer (A') and/or the propylene homopolymer (A) or the propylene α-olefin random copolymer (A) by maintaining the propylene homopolymer (A') or the propylene α-olefin random copolymer (A') and/or the propylene homopolymer (A) or the propylene α-olefin random copolymer (A) at such temperature and for such time as to allow reduction of the FOG value to the desired level to produce a propylene homopolymer (B') or the propylene α-olefin random copolymer (B').

10. The process according to claim 1, wherein the single gas-phase reactor is a horizontally stirred single gas-phase reactor.

11. The process according to claim 1,
wherein the FOG value of the propylene homopolymer (A') or the propylene a-olefin random copolymer (A') is at most 250 µg/g, as determined by VDA 278;

wherein a shifting ratio, which is the ratio of a melt flow rate of the propylene homopolymer (A) or the propylene a-olefin random copolymer (A) to a melt flow rate of the propylene homopolymer (A') or the propylene α-olefin random copolymer (A'), is in the range from 2 to 10;

wherein the melt flow rate of the propylene homopolymer (A) or propylene α-olefin random copolymer (A) as measured according to ISO1133 (2.16 kg, 230° C.) is in the range from 25 to 250 dg/min; and wherein the FOG of the propylene homopolymer (A) or a propylene α-olefin random copolymer (A) is at most 400 µg/g, as determined by VDA 278.

12. The process according to claim 1, wherein the catalyst is a catalyst system which comprises a Ziegler-Natta catalyst and at least one external electron donor, which external electron donor is chosen from the group of a compound having a structure according to Formula III $(R^{90})_2N\text{—Si}(OR^{91})_3$, a compound having a structure according to Formula IV: $(R^{92})Si(OR^{93})_3$, or mixtures thereof, wherein each of $R^{90}$, $R^{91}$, $R^{92}$, and $R^{93}$, groups are each independently a linear, branched or cyclic, substituted or unsubstituted alkyl having between 1 and 10 carbon atoms.

13. The process according to claim 12,
wherein $R^{90}$, $R^{91}$, $R^{92}$, and $R^{93}$, groups are each independently ethyl, methyl or n-propyl;

and organosilicon compounds having general formula $Si(OR^a)_{4-n}R_n$, wherein n is from 0 up to 2, and each of $R^a$ and $R^b$, independently, represents an alkyl or aryl group, containing one or more hetero atoms selected from O, N, S or P, with, 1-20 carbon atoms, and wherein the catalyst system is obtained by a catalyst preparation process comprising the steps of:

A) providing a procatalyst obtainable via a process comprising the steps of:

i) contacting a compound $R^4{}_zMgX^4{}_{2-z}$ with an alkoxy- or aryloxy-containing silane compound to give a first intermediate reaction product, being a solid $Mg(OR^1)_xX^1{}_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms; $X^4$ and $X^1$ are each independently selected from the group of consisting of fluoride (F—), chloride (Cl—), bromide (Br—) or iodide (I—); z is in a range of larger than 0 and smaller than 2, being 0<z<2;

ii) contacting the solid $Mg(OR^1)_xX_{2-x}$, obtained in step i) with at least one activating compound selected from the group formed of activating electron donors and metal alkoxide compounds of formula $M^1(OR^2)_{v-w}(OR^3)_w$, or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; and iii) contacting the first or second intermediate reaction product, obtained respectively in step i) or ii), with a halogen-containing Ti-compound and optionally an internal electron donor to obtain said procatalyst; and B) contacting said procatalyst with a co-catalyst and the at least one external electron donor to form a catalyst.

14. A process for the preparation of preparing a propylene homopolymer or a propylene a-olefin random copolymer comprising the steps of:
   a) preparing a propylene homopolymer or a propylene α-olefin random copolymer, wherein the α-olefin is chosen from the group consisting of ethylene and α-olefins having 4 to 10 carbon atoms, by contacting at least the propylene and optionally α-olefin with a catalyst in a single gas-phase reactor at a temperature T1 and a pressure P1,
   wherein T1 is chosen in the range from 78 to 83° C.;
   wherein P1 is chosen in the range from 22 to 30 bar;
   to prepare a propylene homopolymer (A') or a propylene α-olefin random copolymer (A'); and
   b) visbreaking the propylene homopolymer (A') or the propylene α-olefin random copolymer (A') to obtain a propylene homopolymer (A) or a propylene α-olefin random copolymer (A), wherein the propylene homopolymer (A) respectively the propylene α-olefin random copolymer (A) has a melt flow rate that is higher than the melt flow rate of the propylene homopolymer (A') respectively propylene α-olefin random copolymer (A') as measured according to ISO1133 (2.16 kg, 230° C.);
   wherein the catalyst is a catalyst system comprising a magnesium catalyst and an electron donor; wherein the magnesium catalyst is prepared by reacting titanium tetrachloride, diisobutyl phthalate, and magnesium diethoxide to form a solid material, slurrying the solid material and titanium tetrachloride, and collecting the magnesium catalyst from the slurry; and
   wherein the electron donor comprises n-propyltriethoxysilane; and
   wherein the FOG value of the propylene homopolymer (A') or the propylene α-olefin random copolymer (A') after the visbreaking and before any subsequent processing step is at most 400 μg/g, as determined by VDA 278.

* * * * *